US012170866B2

(12) United States Patent
Williamson et al.

(10) Patent No.: US 12,170,866 B2
(45) Date of Patent: *Dec. 17, 2024

(54) MICROPHONE SUSPENSION SYSTEM

(71) Applicant: Logitech Europe S.A., Lausanne (CH)

(72) Inventors: Clayton Christopher Williamson, Moorpark, CA (US); Tzyy-Woei Richard Sung, Los Angeles, CA (US); Adam Kirk Bennett, Ventura, CA (US); Matthew Fumio Yamamoto, Moorpark, CA (US); Aron Michael Rosenberg, Lafayette, CA (US)

(73) Assignee: Logitech Europe S.A., Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,778

(22) Filed: Oct. 6, 2023

(65) Prior Publication Data

US 2024/0040295 A1 Feb. 1, 2024

Related U.S. Application Data

(63) Continuation of application No. 17/667,118, filed on Feb. 8, 2022, now Pat. No. 11,812,211.

(51) Int. Cl.
*H04R 1/08* (2006.01)

(52) U.S. Cl.
CPC ......... *H04R 1/086* (2013.01); *H04R 2410/07* (2013.01)

(58) Field of Classification Search
CPC ............................ H04R 1/086; H04R 2410/07
See application file for complete search history.

(56) References Cited

U.S. PATENT DOCUMENTS

2018/0324512 A1* 11/2018 Ono ....................... H04R 1/086

* cited by examiner

*Primary Examiner* — Sunita Joshi
(74) *Attorney, Agent, or Firm* — Kilpatrick Townsend & Stockton LLP

(57) ABSTRACT

A microphone includes a housing. The microphone includes a windscreen coupled with the housing. The windscreen and the housing define a central volume. The microphone includes an audio module within the central volume. The audio module includes a receiver capsule, a carrier unit coupled with the receiver capsule, and a counterweight coupled with the carrier unit. The microphone includes a suspension element that is coupled with the housing and carrier unit to suspend the audio module within the central volume. The suspension element includes an inner body that contacts the carrier unit. The suspension element includes first and second flanges extending outward from the inner body. The first and second flange are fixedly coupled with the housing. A cross-section of the first and second flange includes an arched region that extends at least partially to an inner wall of the housing. The arched regions are oriented in opposite directions.

18 Claims, 6 Drawing Sheets

MICROPHONE SUSPENSION SYSTEM

CROSS REFERENCE PARAGRAPH FOR PRIORITY

This application is continuation of U.S. Non-Provisional application Ser. No. 17/667,118, filed on Feb. 8, 2022, and titled "MICROPHONE SUSPENSION SYSTEM," which is hereby incorporated by reference in its entirety for all purposes.

BACKGROUND OF THE INVENTION

During use of a microphone, a user may bump, move, drop, and/or otherwise cause the microphone to be subject to sudden forces. In addition, external forces may be transmitted to the microphone through keyboard typing, mouse usage, HVAC-induced motion, or other environmental or structural conditions. These forces cause vibrations that may propagate to the microphone transducers, which may convert the vibrations into unwanted electrical noise signals. To prevent the unwanted noise, microphones often include isolation components that help reduce any vibrations prior to the vibrations reaching the transducers. However, it is often difficult to balance axial and lateral stiffness and damping of the isolation components to provide sufficient axial translation of the transducer to isolate vibrations while preventing the transducer assemblies from contacting housing and/or other metallic components due to lateral and/or axial movement of the transducer assembly. The ability to balance the axial and lateral stiffness and damping is even more difficult with asymmetrical microphone designs, such as for microphones with a single yoke, as the asymmetrical design may enable additional lateral forces to impact the transducers. Therefore, improvements in vibration isolation systems are desired.

BRIEF SUMMARY OF THE INVENTION

Embodiments of the present invention may include microphone suspension systems that are designed to effectively isolate vibrations from reaching the transducers. To accomplish this, the capsules are suspended by a flexible suspension that provides low axial stiffness, high lateral stiffness, and high damping. To minimize rotations, the suspension may have high lateral stiffness, two attachment points, and the center of gravity of the capsule system may be aligned with the centerline of the suspension. To maximize isolation, the low axial stiffness may be aligned with axis of motion of the capsules. The axial stiffness of the suspension combined with the mass of the capsule (and counterweight, if applicable) may include a resonance, called the suspended resonance of the capsules. At frequencies above the suspended resonance, there is very effective isolation between the external vibrations and the capsule. At frequencies below the suspended resonance, there is little isolation between the external vibrations and capsule. At frequencies around the suspended resonance, the damping plays is effective at absorbing the vibrational energy and maintaining low capsule motion.

Some embodiments of the present technology may encompass microphones. The microphones may include a housing having a proximal end and a distal end. The microphones may include a windscreen coupled with the distal end of the housing. The windscreen and the housing may define a central volume. The microphones may include an audio module disposed within the central volume. The audio module may include a receiver capsule. The audio module may include a carrier unit coupled with a proximal end of the receiver capsule. The microphones may include a suspension element that is coupled with the housing and the carrier unit to suspend the audio module within the central volume. The suspension element may include an inner body that contacts an outer surface of the carrier unit. The suspension element may include a first flange extending outward from a proximal portion of the inner body and a second flange extending outward from a distal portion of the inner body. Each of the first flange and the second flange may be fixedly coupled with the housing. A cross-section of each of the first flange and the second flange comprises an arched region that extends at least partially from the inner body to an inner wall of the housing. The arched region of the first flange may be oriented in an opposite direction than the arched region of the second flange.

In some embodiments, concave sides of the arched regions of the first flange and the second flange may face one another. A thickness of the inner body may be greater than a thickness of each of the first flange and the second flange. A durometer of the suspension element may be between about Shore 20 A and Shore 50 A. The inner body of the suspension element may be friction fit against the outer surface of the carrier unit. The first flange and the second flange may be spaced apart by at least about 20 mm along a longitudinal axis of the microphone. The suspension element may have a greater stiffness along an axial direction of the suspension element than along a lateral direction of the suspension element.

Some embodiments of the present technology may encompass microphones that include a housing comprising a proximal end and a distal end. The microphones may include a windscreen coupled with the distal end of the housing. The windscreen and the housing may define a central volume. The microphones may include an audio module disposed within the central volume. The audio module may include a receiver capsule. The audio module may include a carrier unit coupled with a proximal end of the receiver capsule. The audio module may include a counterweight coupled with a proximal end of the carrier unit. The microphones may include a suspension element that is coupled with the housing and the carrier unit to suspend the audio module within the central volume. The suspension element may include an inner body that contacts an outer surface of the carrier unit. The suspension element may include a first flange extending outward from a proximal portion of the inner body and a second flange extending outward from a distal portion of the inner body. A proximal end of the inner body may extend beyond the first flange and a distal end of the inner body extends beyond the second flange. Each of the first flange and the second flange may be fixedly coupled with the housing. A cross-section of each of the first flange and the second flange may include an arched region that extends at least partially from the inner body to an inner wall of the housing.

In some embodiments, the microphones may include at least one yoke that is rotatably coupled with the housing. A center of mass of the audio module may be aligned with an axis of the at least one yoke. A thickness of each of the first flange and the second flange may be greater at a region proximate the inner body than along a medial portion of the arched region. A distal portion of each of the first flange and the second flange may be clamped against the housing. Outer surfaces of the audio module may be spaced apart from the inner wall of the housing. A body of the receiver capsule and the carrier unit may include a polymeric material that is transparent to electromagnetic interference.

Some embodiments of the present technology may encompass microphones that include a housing comprising a proximal end and a distal end. The microphones may include a windscreen coupled with the distal end of the housing. The windscreen and the housing may define a central volume. The microphones may include an audio module disposed within the central volume. The audio module may include a receiver capsule. The audio module may include a carrier unit coupled with a proximal end of the receiver capsule. The audio module may include a counterweight coupled with a proximal end of the carrier unit. The microphones may include a suspension element that is coupled with the housing and the carrier unit to suspend the audio module within the central volume. The suspension element may include an inner body that contacts an outer surface of the carrier unit. The suspension element may include a first flange extending outward from a proximal portion of the inner body and a second flange extending outward from a distal portion of the inner body. Each of the first flange and the second flange may be fixedly coupled with the housing. A cross-section of each of the first flange and the second flange may include an arched region that extends at least partially from the inner body to an inner wall of the housing.

In some embodiments, at least substantially all of the receiver capsule may be disposed outside of the housing. Each of the first flange and the second flange may include a lip that contacts an outward facing surface of the housing. The inner body of the suspension element may have a thickness of between about 2.5 mm and 4 mm. A medial portion of each of the first flange and the second flange may have a thickness of at least about 0.8 mm. A distance between a base of each arched section and a crest of each arched section may be between about 1 mm and 3 mm.

BRIEF DESCRIPTION OF THE DRAWINGS

A further understanding of the nature and advantages of the disclosed technology may be realized by reference to the remaining portions of the specification and the drawings.

Figure 1A:
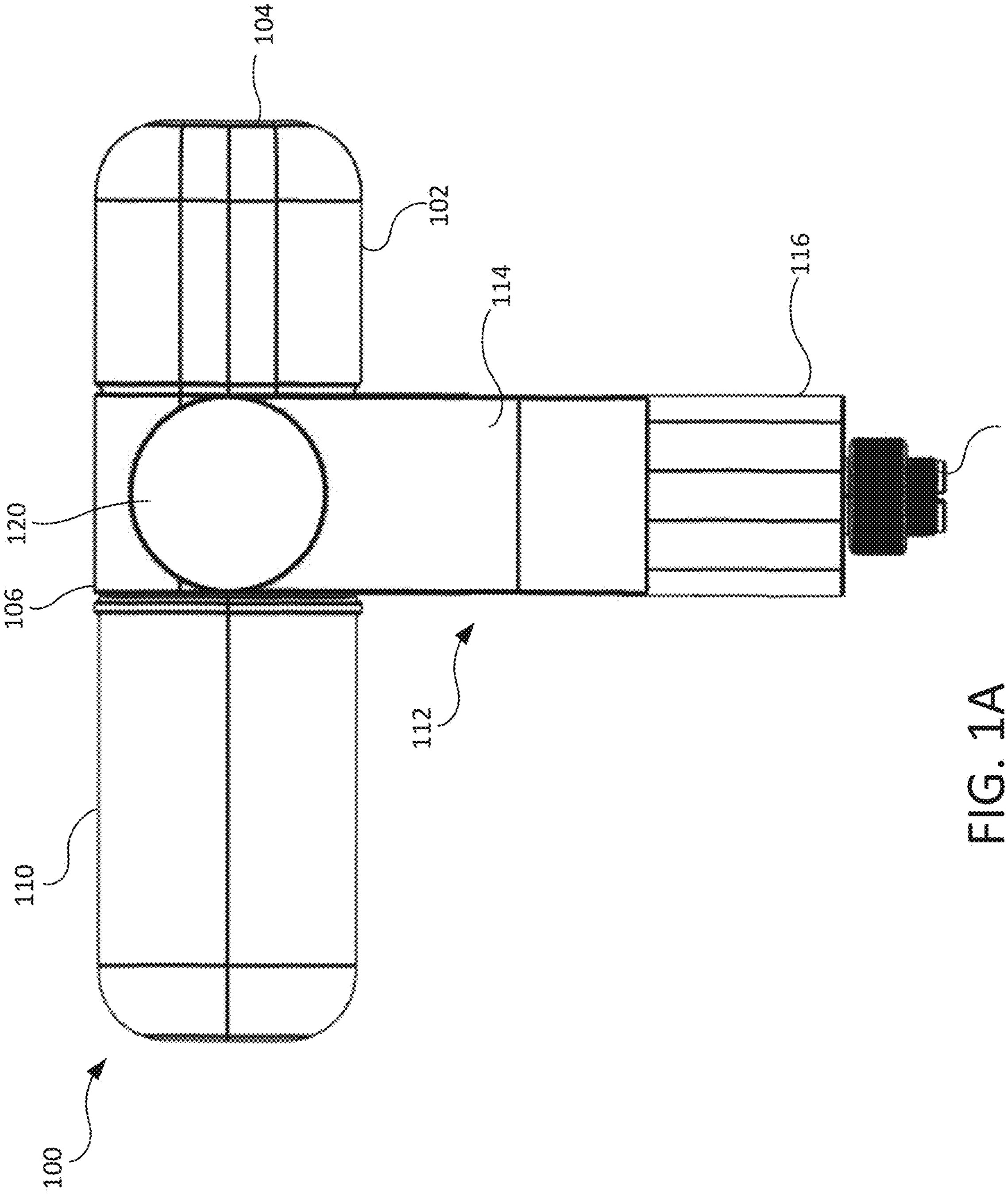
FIG. 1A illustrates a side elevation view of a microphone according to embodiments of the present invention.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention are directed to microphones that include suspension elements that isolate a receiver capsule from a housing of the microphone. For example, the receiver capsule may be suspended within an open interior of the microphone, with the receiver capsule (and any rigid components that are coupled to the receiver capsule) being spaced apart from the housing via the suspension element. The suspension elements may provide greater stiffness in a lateral direction than in an axial direction, which may help prevent the receiver capsule from tilting and/or otherwise moving laterally relative to the housing while still enabling the receiver capsule to translate axially relative to the housing to isolate axial forces. This may help reduce and/or eliminate any noise signals produced from vibrations caused by movements and/or impact of the microphone, either directly or indirectly through the nearby structures.

The suspension elements of the present invention may help lower the suspended resonant frequency of the microphone to low levels, such as between about 20 Hz and 30 Hz, which improve the handling performance of the microphone by making the microphone more resistant to noise signals generated by unwanted vibrations. Additionally, the suspension elements described herein may provide improved vibration isolation and damping in both symmetric and asymmetric microphone designs. For example, the suspension elements may provide lateral stiffness that enables improved handling of lateral forces, including both symmetric lateral forces present in dual yoke microphones and asymmetric lateral forces present in single yoke microphones, while remaining sufficiently soft in the axial direction to dampen axial forces. The stiffness in the axial direction may also be selected to ensure that an audio module of the microphone does not impact the housing or other metallic/rigid components of the microphone, which might cause damage and/or unwanted noise. For example, the axial stiffness may be selected to either prevent or significantly increase the amount of acceleration required to cause collisions between the audio module and the chassis of the microphone.

Figure 1B:
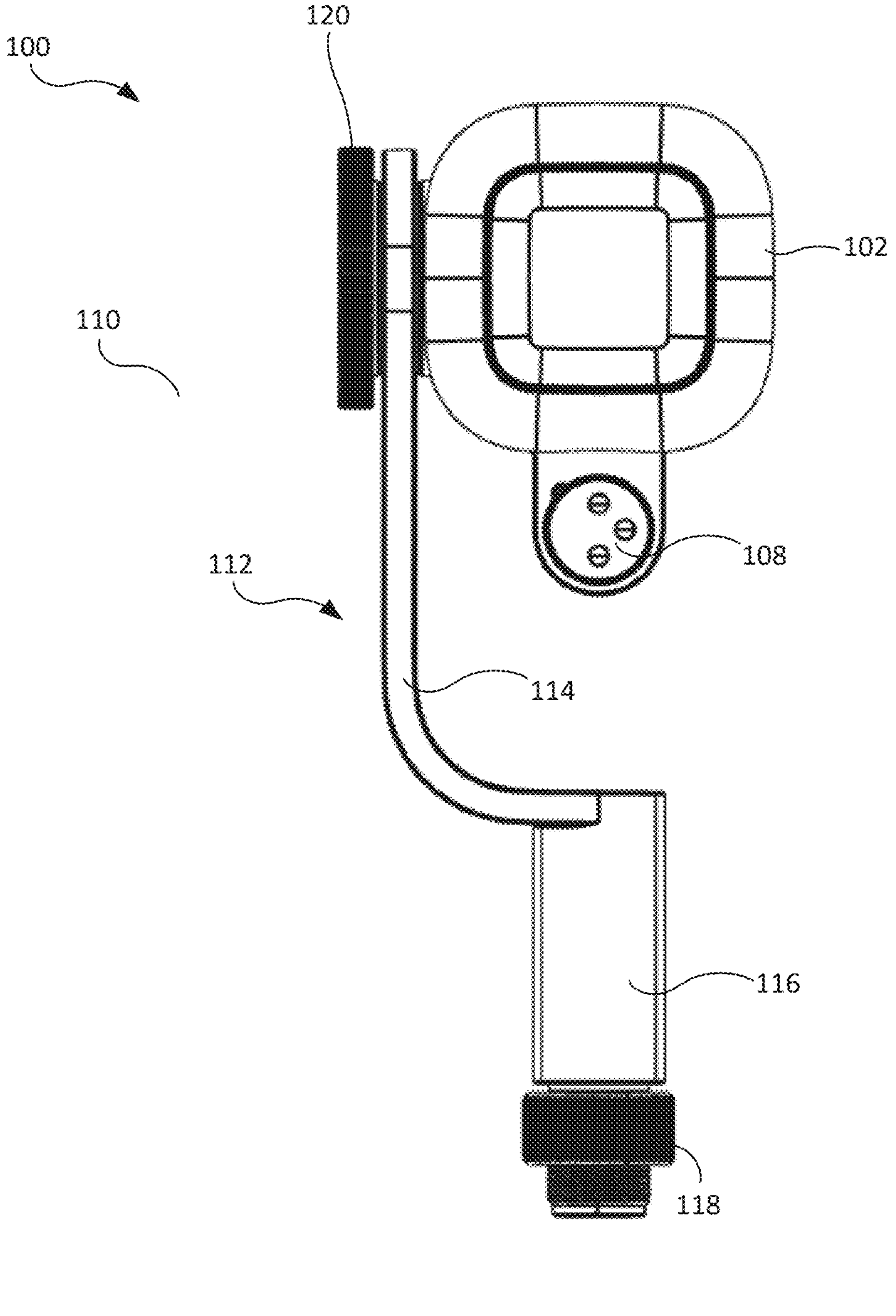
FIG. 1B illustrates a rear elevation view of the microphone of FIG. 1A.
Figure 1C:
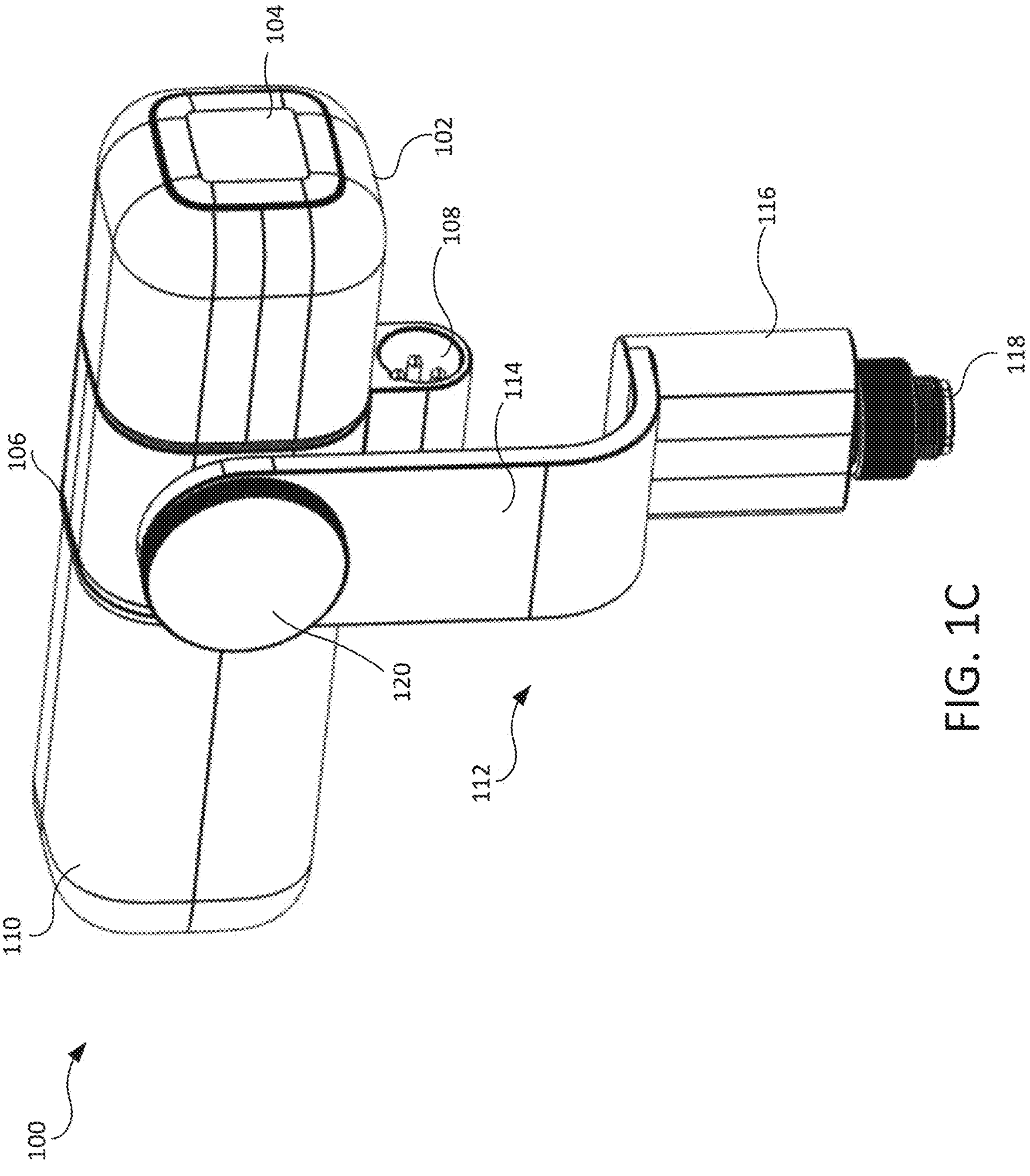
FIG. 1C illustrates a rear isometric view of the microphone of FIG. 1A.

Turning now to FIGS. 1A-1C, an embodiment of a microphone 100 is illustrated. Microphone 100 may include a housing 102, which may include a proximal end 104 and a distal end 106. The housing 102 may define an open interior that may receive internal components of the microphone 100. The housing 102 may include a connector portion 108 that may protrude outward from a main body of the housing 102 in some embodiments. The connector portion 108 may include one or more electrical connectors that may be used to supply power to the microphone 100 and/or to transmit audio signals to external speaker devices (not shown). For example, one or more cables may be plugged into and/or otherwise interfaced with electrical connectors provided at the connector portion 108. As illustrated, the connector portion 108 may protrude from a lower surface of the housing 102, although other locations of the connector portion 108 are possible. In some embodiments, the connector portion 108 may be formed into a rear surface, such as on the proximal end 104 of the housing 102. In such embodiments, the connector portion 108 may not protrude from the housing 102, but may instead be formed into the general shape of the housing 102.

The microphone 100 may include a windscreen 110 that may be coupled with the distal end 106 of the housing 102. The windscreen 110 may be formed from a porous and/or mesh material (such as a foam or a perforated plastic and/or metal material) that may enable sound waves to propagate therethrough. The windscreen 110 may define an open interior such that when coupled with the housing 102, the open interiors of the housing 102 and the windscreen 110 together define a central volume in which the various internal components of the microphone 100 are housed. While shown with the housing 102 and windscreen 110 having a generally rectangular cross-section (with rounded corners), it will be appreciated that the housing 102 and windscreen 110 may have any cross-sectional shape. The housing 102 and windscreen 110 may have the same or different cross-sectional shape and/or size. For example, the windscreen 110 may be larger or smaller than the housing 102 in some embodiments. The cross-sectional shape of the housing 102 and/or windscreen 110 may be constant and/or may vary across a length of the respective component.

In some embodiments, the microphone 100 may include one or more yokes 112 that may enable the microphone 100 to be swiveled and/or otherwise rotated relative to a mounting structure (such as a microphone stand). As illustrated, a single yoke 112 is coupled with a lateral surface of the housing 102, such as near the distal end 106. In embodiments with two yokes, a yoke 112 may be positioned on each lateral surface of the housing 102 opposite one another. Each yoke 112 may include an arm 114 that couples to a mounting body 116. For example, as illustrated, the arm 114 includes a bend such that the mounting body 116 may be positioned at least substantially below a center of the housing 102, while still enabling the yoke 112 to couple with a lateral surface of the housing 102. This may enable the microphone 100 to be mounted at least substantially in alignment with a microphone stand or other mounting structure. A base of the mounting body 116 may include a connector 118, such as a threaded connector, clamp, and/or other mechanism that may be used to secure the yoke 112 and microphone 100 to a microphone stand or other mounting structure. A top end of the yoke 112 may include a knob 120, which may include and/or be coupled with a threaded connector. In some embodiments, the knob 120 may be loosened to enable the microphone 100 to pivot and/or rotate about a rotational axis of the yoke 112/knob 120, and may be tightened to secure the microphone 100 in a desired orientation relative to the arm 114. In other embodiments, the knob 120 may be used to secure the housing 102 of the microphone 100 to the yoke 112 with a friction fit that enables an orientation of the microphone 100 to be adjusted relative to the yoke 112 without loosening or tightening the knob 120. For example, a user may simply pivot the housing 102 and windscreen 110 about the axis of rotation of the yoke 112 to a desired position and friction between the yoke 112 and the housing 102 may maintain the housing 102 and windscreen 110 in the desired position.

Figure 2:
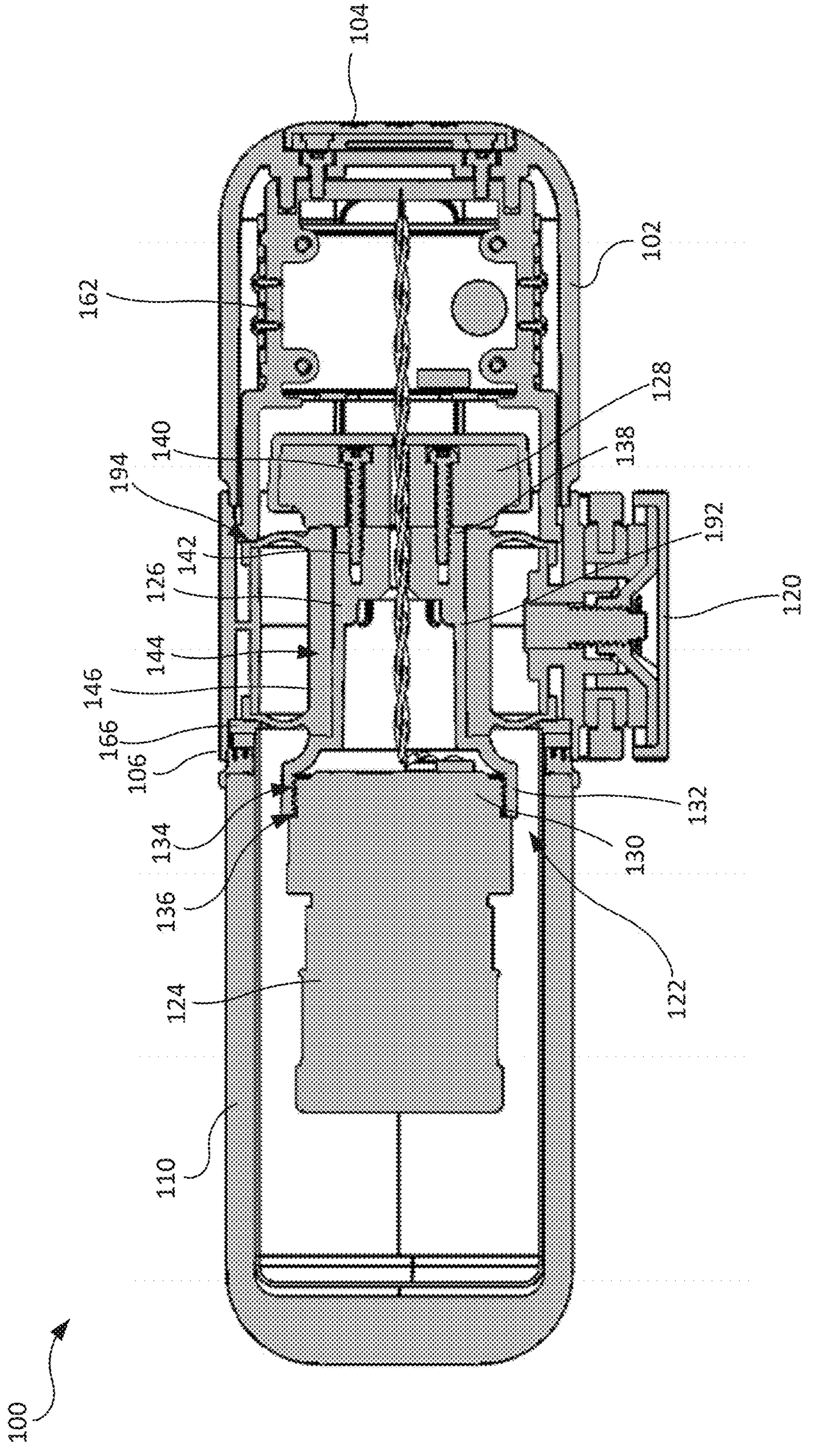
FIG. 2 illustrates a cross-sectional top plan view of the microphone of FIG. 1A according to embodiments of the present invention.

FIG. 2 illustrates a cross-sectional view of microphone 100. As illustrated, the microphone 100 may include an audio module 122 that is disposed within the central volume defined by the open interiors of the housing 102 and windscreen 110. The audio module 122 may include a receiver capsule 124, a carrier unit 126, and a counterweight 128. The receiver capsule 124 may include transducer components that convert sound waves into electrical currents. The conversion technology within the receiver capsule 124 may include dynamic, condenser, ribbon, microelectromechanical, and/or crystal conversion equipment. As just one example, the receiver capsule 124 may operate using dynamic conversion technology and may include one or more wire coils that are positioned proximate to a magnet, with a diaphragm covering the wire coil. Sound waves passing through the windscreen 110 may hit the diaphragm, causing the diaphragm to vibrate. The wire coil may be coupled to a rear surface of the diaphragm such that vibrations of the diaphragm are propagated to the wire coil, causing the wire coil to translate along a longitudinal axis of the microphone 100. The movement of the wire coil causes corresponding changes in a magnetic field generated by the magnet, and generates an electrical signal in the wire coil. This electrical signal corresponds to the sound being recorded and/or otherwise detected by the microphone 100. The electrical signal may be delivered to an output device, such as a speaker, via one or more wires that extend from the receiver capsule 124 to the electrical connectors of the connector portion 108.

In some embodiments, at least substantially all of the receiver capsule 124 may be disposed outside of the housing 102. For example, at least or about 99%, or more of the receiver capsule 124 may be disposed within the open interior of the windscreen 110 and outside of the housing 102 (e.g., beyond the distal end 106). In some embodiments, an entirety of the receiver capsule 124 may be positioned within the windscreen 110. Such positioning may help improve audio quality by limiting noise associated with electromagnetic interference (EMI) as will be discussed in greater detail below. The receiver capsule 124 may be positioned a distance of at least about 35 mm, at least or about 36 mm, at least or about 37 mm, at least or about 38 mm, at least or about 39 mm, at least or about 40 mm, or more from the distal end of the windscreen 110, which may help improve the audio quality of the microphone 100. The carrier unit 126 may be coupled with a proximal end 130 of the receiver capsule 124. For example, the carrier unit 126 and the proximal end 130 of the receiver capsule 124 may include corresponding connectors that may be engaged to secure the receiver capsule 124 and the carrier unit 126 together. As illustrated, each of the carrier unit 126 and the proximal end 130 of the receiver capsule 124 includes a threaded connector that enables the components to be threaded together, although other fastening mechanisms may be used in various embodiments. In the present embodiment, a distal end 132 of the carrier unit 126 defines a female threaded connector 134 that receives a corresponding male threaded connector 136 formed on the proximal end 130 of the receiver capsule 124, however, in some embodiments the female connector may be provided on the receiving capsule 124 while the male connector may be provided on the carrier unit 126.

In some embodiments, both a body of the receiver capsule 124 and the carrier unit 126 may be formed from and/or otherwise include a polymeric material that is transparent to EMI. For example, the body of the receiver capsule 124 and the carrier unit 126 may include acrylonitrile butadiene styrene (ABS) plastic and/or other EMI transparent polymers. By making both components out of an EMI transparent material (and positioning the receiver capsule 124 outside of the housing 102), a voice coil and a humbucking coil present within the receiving capsule 124 may cancel each other out by being present in the same EMI field. This may help eliminate external noise associated with EMI and may result in the microphone recording higher quality audio signals.

The counterweight 128 may be coupled with a proximal end 138 of the carrier unit 126. For example, the counterweight 128 may be fastened to the proximal end 138 of the carrier unit 126, such as by using one or more screws 140 and/or other fasteners. As illustrated, each screw 140 extends entirely through a channel formed in a body of the counterweight 128, with a distal end of each screw 140 engaging with a threaded receptacle 142 formed in the proximal end 138 of the carrier unit 126. A mass and/or size of the counterweight 128 may be selected such that a center of mass of the audio module 122 is aligned with the rotation of axis of the yoke(s) 112. This positioning of the center of mass may help ensure that the audio module 122 will stay in proper alignment with a longitudinal axis of the housing 102 and the windscreen 110 when the microphone 100 is pivoted and/or otherwise moved relative to the yoke 112 and/or a microphone mounting structure. In embodiments in which at least substantially all of the receiver capsule 124 is positioned outside of the housing 102, the mass and/or length of the counterweight 128 may be increased to maintain the center of mass of the audio module 122 in alignment with the rotation of axis of the at least one yoke 112. The counterweight 128 may be formed from and/or include a soft material, such as a polymeric material, which may help dampen any impacts between the counterweight 128 and metallic and/or other rigid components of the microphone 100. In a particular embodiment, the counterweight 128 may be coated with a dampening material, such as, but not limited to, butyl rubber, silicone, and/or foam.

Microphone 100 may include a suspension element 144 that is coupled with the housing 102 and the carrier unit 126 to suspend the audio module 122 within the central volume defined by the open interiors of the housing 102 and windscreen 110. For example, the suspension element 144 may suspend the audio module 122 within the central volume such that the outer surfaces of the audio module 122 are spaced apart from the inner surfaces of the housing 102 and/or windscreen 110. The suspension element 144 may include an inner body 146 that contacts an outer surface of the carrier unit 126. For example, the inner body 146 may be generally cylindrical in shape and may define an open interior that receives a main body 192 of the carrier unit 126. In some embodiments, the inner surface of the inner body 146 may be friction fit against the outer surface of the main body 192 of the carrier unit 126. In some embodiments, one or more adhesives and/or fastening mechanisms may be used to secure the inner body 146 about the carrier unit 126. For example, an adhesive may be applied between the inner surface of the inner body 146 and the outer surface of the main body 192 of the carrier unit 126. In some embodiments, fasteners, such as clamps and/or straps may be used to secure the inner body 146 to the carrier unit 126, such as by applying compressive force that maintains the inner body 146 firmly against the outer surface of the main body 192 of the carrier unit 126. In some embodiments, all or a substantial portion of the inner body 146 may be adhered and/or fastened to the carrier unit 126, while in other embodiments only portions near the distal and proximal ends of the inner body 146 may be adhered and/or fastened to the carrier unit 126, as the end regions of the inner body 146 may be more likely to deform and/or pull away from the carrier unit 126 when the microphone 100 is moved.

Figure 2A:
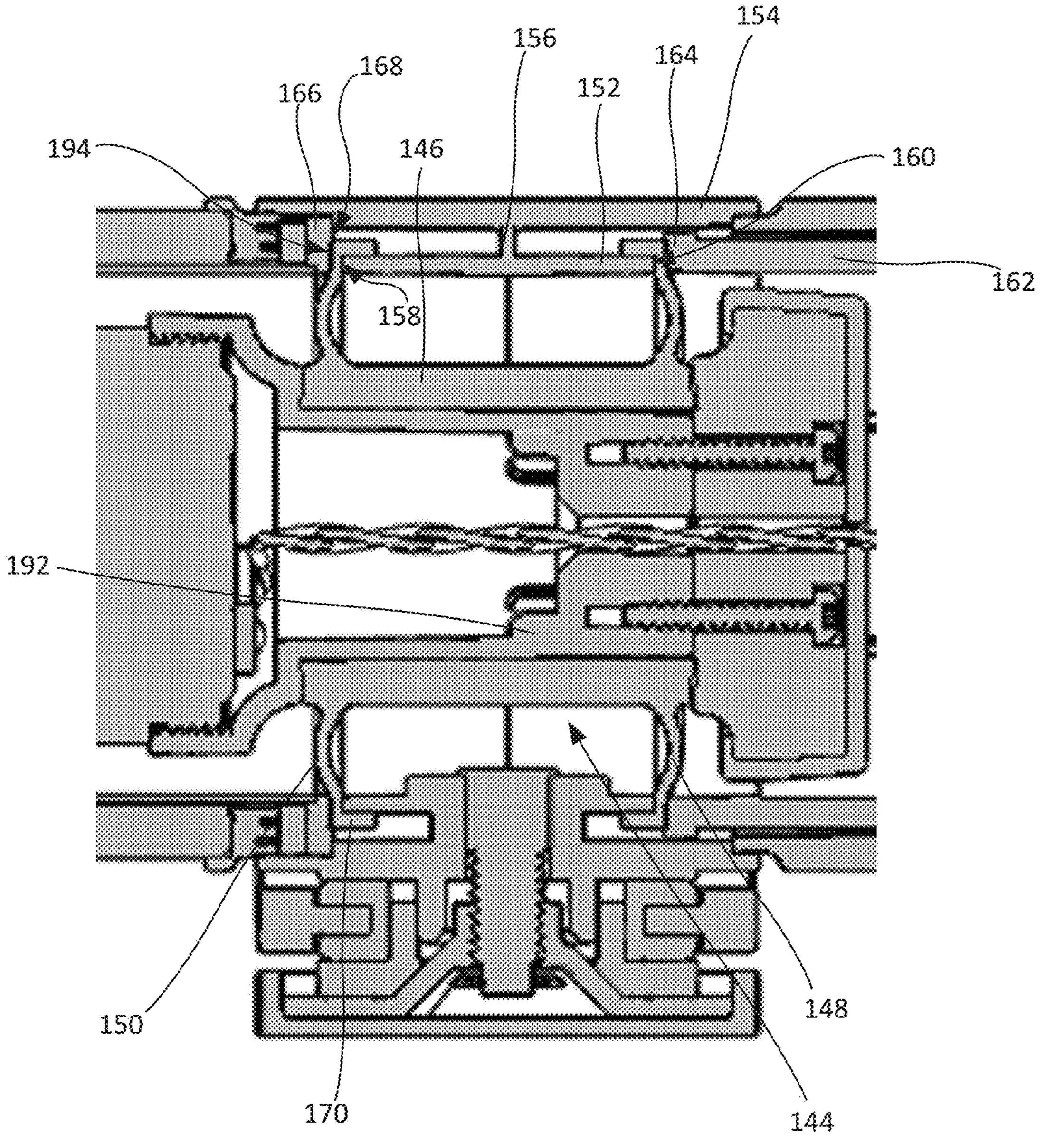
FIG. 2A illustrates a partial cross-sectional top plan view of the microphone of FIG. 1A.

As illustrated in FIG. 2A, the suspension element 144 may include flanges positioned proximate each end of the inner body 146. For example, a first flange 148 may extend outward from a proximal portion of the inner body 146 and a second flange 150 may extend outward from a distal portion of the inner body 146. The first flange 148 and the second flange 150 may be spaced apart from one another along the longitudinal axis of the microphone 100. For example, the first flange 148 and the second flange 150 may be spaced apart by at least or about 20 mm, at least or about 21 mm, at least or about 22 mm, at least or about 23 mm, at least or about 24 mm, at least or about 25 mm, or more along the longitudinal axis. Such a distance between the first flange 148 and the second flange 150 may enable the suspension element 144 to be sufficiently soft (e.g., low stiffness) to enable the suspension element 144 (and audio module 122) to translate along the longitudinal axis of the microphone 100 to dampen axial forces, while being sufficiently stiff so as to prevent the audio module 122 from translating far enough within the central volume so as to impact any metallic and/or otherwise rigid components of the microphone 100. Each flange may extend radially outward beyond the outer surfaces of the components that form the audio module 122, which may enable the suspension element 144 to maintain the audio module 122 in a position within the central volume such that the outer surfaces of the audio module 122 are spaced apart from inner surfaces of the housing 102 and the windscreen 110.

The first flange 148 and the second flange 150 may be used to secure the suspension element 144 within the housing 102. For example, each of the first flange 148 and the second flange 150 may be fixedly coupled with the housing 102. For example, a distal portion of each of the first flange 148 and the second flange 150 may be clamped against the housing 102. As illustrated, the housing 102 may include an inner flange 152 that is spaced apart from an outer wall 154 of the housing 102. For example, an arm 156 may extend between the outer wall 154 and the inner flange 152. The arm 156 may protrude inward into the housing 102 from the outer wall 154 to space the inner flange 152 apart from the outer wall 154. Inward facing surfaces 158 of the first flange 148 and the second flange 150 may be positioned against distal edges 160 of the inner flange 152. The microphone 100 may include an internal frame 162 (which may include electrical components, such as a circuit board and/or processor of the microphone 100) that is disposed within the housing 102. The internal frame 162 may be positioned against and/or coupled with an inner surface of the proximal end 104 of the housing 102. A distal end 164 of the internal frame 162 may contact an outer surface 194 of the first flange 148 and may clamp the first flange 148 against one of the distal edges 160 of the inner flange 152. The distal end 106 of the housing 102 may include a collar assembly 166 that may be used to secure the housing 102 and windscreen 110 together. An inner facing surface 168 of the collar assembly 166 may contact an outer surface 194 of the second flange 150 and may clamp the second flange 150 against one of the distal edges 160 of the inner flange 152.

Figure 3A:
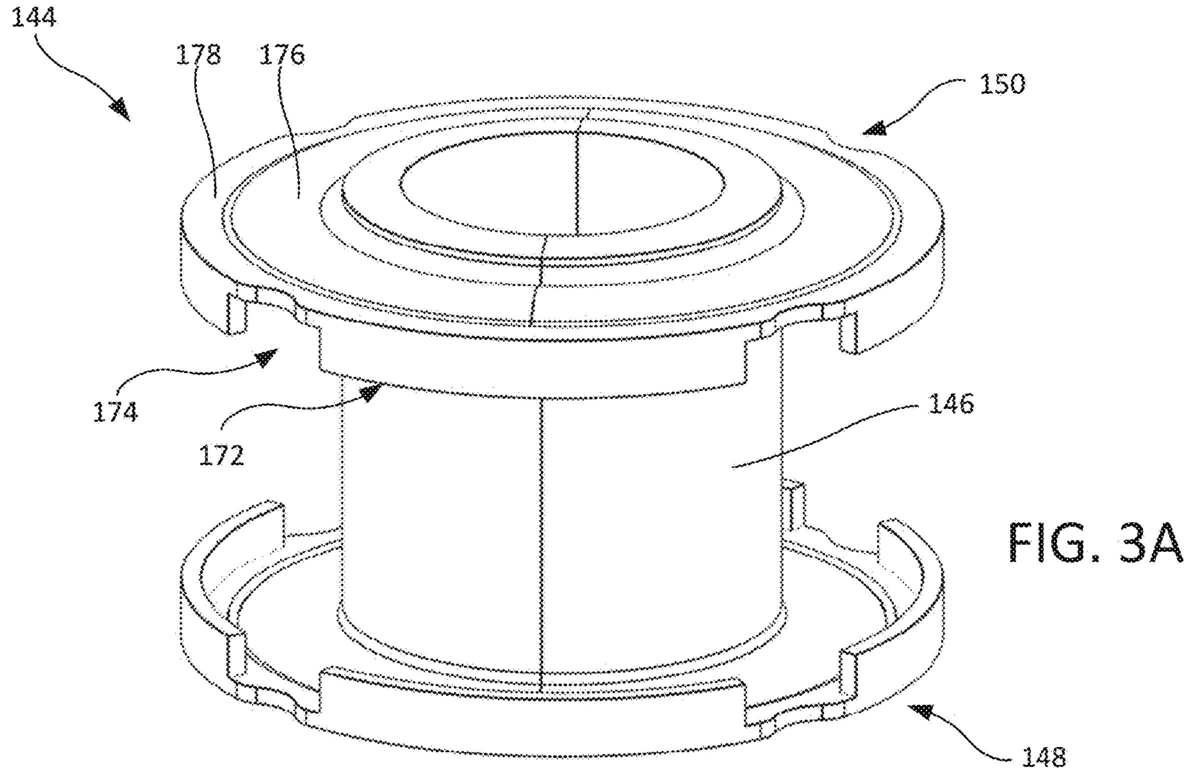
FIG. 3A illustrates an isometric view of a suspension element of the microphone of FIG. 1A according to embodiments of the present invention.

In some embodiments, the first flange 148 and/or the second flange 150 may include a lip 170 that contacts a surface of the housing 102. For example, the lip 170 may extend from a distal edge of the first flange 148 and/or the second flange 150, and may be at least substantially orthogonal to the portion of the respective flange that is clamped against the housing 102. For example, as illustrated, each lip 170 is at least substantially parallel with the longitudinal axis of the microphone 100. The lips 170 may then contact a surface of the housing 102, which may help prevent the suspension element 144 from pulling away from one side of the housing 102 far enough for the audio module 122 to impact the opposite side of the housing 102. For example, as illustrated the lips 170 are directed toward one another and contact an outer side surface of the inner flange 152. While shown with the lips 170 directed toward one another, in some embodiments the lips 170 may be directed away from one another and/or in a direction that is not parallel to the longitudinal axis of the microphone 100. In some embodiments, each lip 170 may be continuous and may extend entirely about a periphery of the suspension element 144. In other embodiments, the lips 170 may be discontinuous about the outer periphery of the suspension element 144. For example, as illustrated in FIG. 3A, each lip 170 may include one or more segments 172 that are separated by gaps 174. Such a design may help enable the suspension element 144 to be clamped taut to the body 156 such that the suspension element 144 may better dampen disturbances in all directions.

Figure 3B:
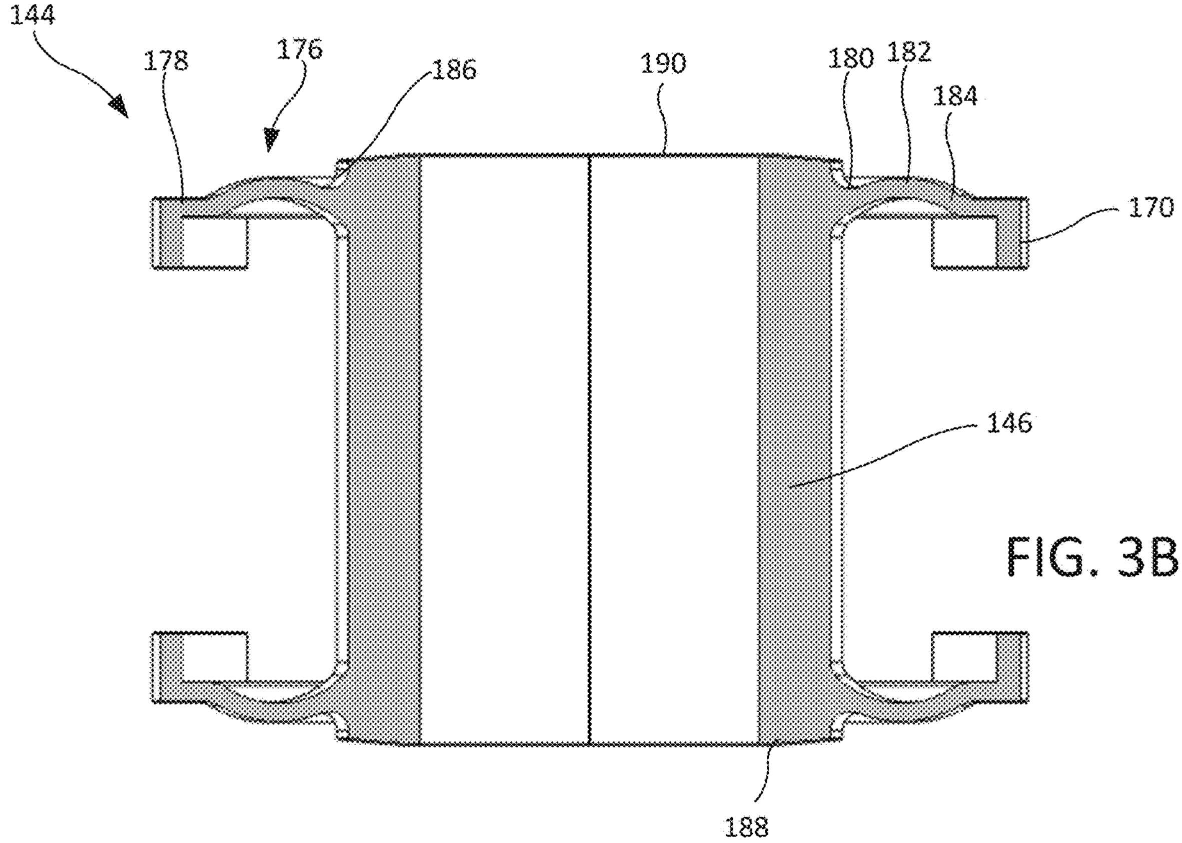
FIG. 3B illustrates a cross-sectional side elevation view of the suspension element of FIG. 3A.

As best illustrated in FIG. 3B, a cross-section of each of the first flange 148 and/or the second flange 150 may include an arched region 176 that may extend at least a portion of the distance from the inner body 146 to an inner wall of the housing 102, such as to the inner flange 152. For example, as illustrated, the arched regions 176 extend outward from an outer surface of the inner body 146 to a linear segment 178, which may be or include the distal portion of the respective flange that is clamped against the housing 102. The linear segment 178 may extend along a direction that is at least substantially orthogonal to the longitudinal axis of the microphone 100 in some embodiments. The arched regions 176 of the first flange 148 and the second flange 150 may be oriented in opposite directions, which may enable the audio module to translate axially to dampen axial forces while still providing sufficient stiffness to prevent the audio module 122 from translating axially so far that the audio module 122 contacts a metallic and/or otherwise rigid component of the microphone 100. For example, as illustrated, concave sides of the arched regions 176 of the first flange 148 and the second flange 150 face one another, although in other embodiments convex sides of the arched regions 176 may face one another. The arched regions 176 may extend continuously about the respective flange so as to define a generally annular arched region that extends entirely about the inner body 146, as best illustrated in FIG. 3A.

Turning back to FIG. 3B, a portion of the inner body 146 may extend beyond each of the first flange 148 and the second flange 150. For example, a proximal end 188 of the inner body 146 may extend beyond the first flange 148 and a distal end 190 of the inner body 146 may extend beyond the second flange 150. As illustrated, each of the first flange 148 and the second flange 150 extends from the inner body 146 slightly inward of the extreme ends of the inner body 146, which may help provide additional axial and lateral stiffness to the suspension element 144. Additionally, a peak or other outermost portion of each arched region 176 may extend to a position that is inset from the respective extreme end of the inner body 146.

Each arched region 176 may encompass between or about 60 degrees and 120 degrees, between or about 70 degrees and 110 degrees, between or about 80 degrees and 100 degrees, or about 90 degrees. A radius of each arched region 176 may be at least or about 5.2 mm, at least or about 5.25 mm, at least or about 5.3 mm, at least or about 5.35 mm, at least or about 5.4 mm, or more. Each arched region 176 may have a height of at least or about 1 mm, at least or about 1.5 mm, at least or about 2 mm, at least or about 2.5 mm, at least or about 3 mm, or more. The height may be measured as the distance between a topmost surface of a peak of the arched region 176 and a base of the arched region 176 (such as a lower surface of the linear segment 178). The height of the arched region 176 may be proportional to the amount of axial translation that is permitted by the suspension element 144, with greater heights permitting greater axial translation of the audio module 122 within the central volume.

Each arched region 176 may have a substantially constant thickness, which may or may not be the same as a thickness of the linear segment 178 and/or the lip 170. As illustrated, the thickness of the arched region 176 is substantially the same as a thickness of the linear segment 178, with the lip 170 being slightly thicker. For example, a thickness of the arched region 176 (including at least a medial portion 182 and an outer portion 184) and linear segment 178 may be at least or about 0.8 mm, at least or about 0.85 mm, at least or about 0.9 mm, at least or about 0.95 mm, at least or about 1 mm, or more, while a thickness of the lip 170 may be at least or about 1 mm, at least or about 1.05 mm, at least or about 1.1 mm, at least or about 1.15 mm, at least or about 1.2 mm, at least or about 1.25 mm, or more. The thickness of each of the first flange 148 and second flange 150 (including the arched regions 176, linear segment 178, and lip 170) may help provide sufficient flexibility of the suspension element in an axial direction to help dampen forces having a longitudinal component, while ensuring that the flanges are sufficiently strong to resist tearing or otherwise failing. By making the lips 170 thicker than the arched region 176 and/or linear segment 178, the lips 170 may help resist pulling forces that may otherwise pull the respective flange out of engagement with the housing 102.

In some embodiments, an inner portion 180 of each arched region 176 may be thicker than the rest of the arched region 176 (e.g., medial portion 182 and outer portion 184 of the arched region 176), which may help strengthen the connection between the inner body 146 and the respective flange. For example, the inner portion 180 (proximate the inner body 146) may include a fillet 186 and/or other region of increased thickness that may further strengthen the attachment of the flange to the inner body 146. The fillet 186 may be positioned on a convex side of the arched region 176 at the junction of the flange and the inner body 146. In addition to strengthening the connection between the connection between the inner body 146 and the respective flange, the fillet 186 may help prevent the rotation of the respective flange relative to the inner body 146. This may help prevent tilting or twisting of the audio module 122 relative to the housing 102 and windscreen 110. In some embodiments, the inner portion 180 of each arched region 176 may extend further toward the opposite flange than the outer portion 184 of the arched region 176, which may further increase the thickness of the inner portion 180 of the arched region 176. The fillet 186 may have a radius of between about 0.8 mm and 1.2 mm, which may provide enough material to prevent tearing and damage to the medial portion 182 during activation while also being sufficiently thin to reduce interference with the arched region 176.

The inner body 146 may have a greater thickness than the first flange 148 and second flange 150. For example, a thickness of the inner body 146 may be between about 2.5 mm and 4 mm or between or about 3 mm and 3.5 mm, which may be sufficiently thick to reduce interference with the operation of the arched region 176, but thin enough to keep the overall size of the suspension element 144 compact. By making the thickness of the inner body 146 within this range, the inner body 146 may have sufficient stiffness to resist peeling away from the outer surface of the carrier unit 126 during movement of the audio module 122 relative to the housing 102 and/or windscreen 110. Additionally, by making a thickness of the flanges within the disclosed range, the suspension element 144 may enable sufficient axial translation of the audio module 122 to dampen axial forces, while ensuring that the flanges are sufficiently strong so as to not tear or otherwise fail and also limiting a distance that the audio module 122 may travel axially within the central volume.

The suspension element 144 may be formed of a flexible polymeric material, which may enable the suspension element 144 to dampen forces along the longitudinal axis of the microphone 100 as the microphone 100 is moved, impacted, and/or otherwise subjected to undesired vibrations. In some embodiments, the suspension element 144 may be formed from a material that has a durometer of between about Shore 20 A and Shore 50 A, between about Shore 25 A and Shore 45 A, between about Shore 30 A and Shore 40 A, or about Shore 35 A. Such a material may provide sufficient stiffness to prevent tilting or other movement of the audio module 122 toward the walls of the housing 102 and/or windscreen 110, while still enabling the first flange 148 and second flange 150 to be sufficiently flexible to dampen forces along the longitudinal axis of the microphone 100. In particular embodiments, the suspension element 144 may include santoprene rubber, butyl rubber, and/or other material having similar durometer.

As noted above, the geometry (including thicknesses) and materials of the suspension element 144 may help provide sufficient stiffness in the lateral direction while being flexible in an axial direction. For example, the suspension element 144 may exhibit a stiffness of between about 0.01 mm/N and 0.1 mm/N, between or about 0.015 mm/N and 0.09 mm/N, between or about 0.02 mm/N and 0.08 mm/N, between or about 0.025 mm/N and 0.07 mm/N, between or about 0.03 mm/N and 0.06 mm/N, between or about 0.035 mm/N and 0.05 mm/N, or about 0.04 mm/N in the lateral direction. The suspension element 144 may exhibit a stiffness of between or about 0.1 mm/N and 1 mm/N, between or about 0.2 mm/N and 0.9 mm/N, between or about 0.3 mm/N and 0.8 mm/N, between or about 0.4 mm/N and 0.7 mm/N, or between or about 0.5 mm/N and 0.6 mm/N in the axial direction. This may enable the suspension element 144 to prevent the audio module 122 from tilting or otherwise moving in a lateral direction, while permitting axial movement of the audio module to dampen unwanted axial forces. Additionally, by maintaining a minimum axial stiffness, the suspension element 144 may help prevent the counterweight 128 from traveling far enough to hit the internal frame 162 and cause unwanted noise signals. Oftentimes, the internal frame 162 may be spaced apart from the counterweight 128 by less than 3 mm, although other distances are possible in various embodiments. In embodiments in which larger gaps between the counterweight 128 and internal frame 162 are utilized, a length of the carrier unit 126 and/or receiver capsule 124 may be increased to enable the audio module 122 to be balanced about the pivot point of the microphone 100 (e.g., the center of mass of the audio module 122 being aligned with the rotational axis of the yoke 112).

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein, including in the claims, "and" as used in a list of items prefaced by "at least one of" or "one or more of" indicates that any combination of the listed items may be used. For example, a list of "at least one of A, B, and C"

includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A microphone comprising:
a housing comprising a proximal end and a distal end, the housing defining a central volume;
an audio module disposed within the central volume and a suspension element configured to suspend the audio module within the central volume, wherein:
the suspension element comprises an inner body the suspension element comprises a first flange extending outward from a proximal portion of the inner body and a second flange extending outward from a distal portion of the inner body;
each of the first flange and the second flange are fixedly coupled with the housing;
a cross-section of each of the first flange and the second flange comprises an arched region that extends at least partially from the inner body to an inner wall of the housing; and
the arched region of the first flange is oriented in an opposite direction than the arched region of the second flange.

2. The microphone of claim 1 wherein:
concave sides of the arched regions of the first flange and the second flange face one another.

3. The microphone of claim 1 wherein:
a thickness of the inner body is greater than a thickness of each of the first flange and the second flange.

4. The microphone of claim 1 wherein:
a durometer of the suspension element is between about Shore 20 A and Shore 50 A.

5. The microphone of claim 1 wherein:
the first flange and the second flange are spaced apart by at least about 20 mm along a longitudinal axis of the microphone.

6. The microphone of claim 1 wherein:
the suspension element has a greater stiffness along an axial direction of the suspension element than along a lateral direction of the suspension element.

7. A microphone comprising:
a housing comprising a proximal end and a distal end, the housing defining a central volume;
an audio module disposed within the central volume and
a suspension element that is coupled with the housing that suspends the audio module within the central volume, wherein:
the suspension element comprises an inner body;
the suspension element comprises a first flange extending outward from a proximal portion of the inner body and a second flange extending outward from a distal portion of the inner body;
a proximal end of the inner body extends beyond the first flange and a distal end of the inner body extends beyond the second flange;
each of the first flange and the second flange are fixedly coupled with the housing; and
a cross-section of each of the first flange and the second flange comprises an arched region that extends at least partially from the inner body to an inner wall of the housing.

8. The microphone of claim 7 further comprising:
at least one yoke that is rotatably coupled with the housing.

9. The microphone of claim 8 wherein:
a center of mass of the audio module is aligned with an axis of the at least one yoke.

10. The microphone of claim 7 wherein:
a thickness of each of the first flange and the second flange is greater at a region proximate the inner body than along a medial portion of the arched region.

11. The microphone of claim 7 wherein:
a distal portion of each of the first flange and the second flange is clamped against the housing.

12. The microphone of claim 7 wherein:
outer surfaces of the audio module are spaced apart from the inner wall of the housing.

13. A microphone comprising:
a housing comprising a proximal end and a distal end;
a windscreen coupled with the distal end of the housing, the windscreen and the housing defining a central volume;
an audio module disposed within the central volume, the audio module comprising:
a receiver capsule;
a carrier unit coupled with a proximal end of the receiver capsule; and
a counterweight coupled with a proximal end of the carrier unit; and
a suspension element that is coupled with the housing and the carrier unit to suspend the audio module within the central volume, wherein:
the suspension element comprises an inner body that contacts an outer surface of the carrier unit;
the suspension element comprises a first flange extending outward from a proximal portion of the inner body and a second flange extending outward from a distal portion of the inner body;
each of the first flange and the second flange are fixedly coupled with the housing; and
a cross-section of each of the first flange and the second flange comprises an arched region that extends at least partially from the inner body to an inner wall of the housing.

14. The microphone of claim 13 wherein:
at least substantially all of the receiver capsule is disposed outside of the housing.

15. The microphone of claim 13 wherein:
each of the first flange and the second flange comprises a lip that contacts an outward facing surface of the housing.

16. The microphone of claim 13 wherein:
the inner body of the suspension element has a thickness of between about 2.5 mm and 4 mm.

17. The microphone of claim 13 wherein:
a medial portion of each of the first flange and the second flange has a thickness of at least about 0.8 mm.

18. The microphone of claim 13 wherein:
a distance between a base of each arched section and a crest of each arched section is between about 1 mm and 3 mm.

* * * * *